United States Patent [19]
Higaki et al.

[11] Patent Number: 5,534,965
[45] Date of Patent: Jul. 9, 1996

[54] CAMERA

[75] Inventors: Riichi Higaki, Kawasaki; Hiroyuki Tsuru, Tokyo; Hiroshi Wakabayashi, Yokohama; Daiki Tsukahara, Hiratsuka; Yoshikazu Iida, Chigasaki; Tadashi Ohtani, Ohtawara, all of Japan

[73] Assignee: Nikon Corporation, Tokyo, Japan

[21] Appl. No.: 335,356

[22] Filed: Nov. 3, 1994

[30] Foreign Application Priority Data

Nov. 9, 1993 [JP] Japan .................................. 5-279432
Nov. 9, 1993 [JP] Japan .................................. 5-279433

[51] Int. Cl.⁶ ........................... G03B 13/36; G03B 17/18
[52] U.S. Cl. .......................................... 354/409; 354/471
[58] Field of Search .................................. 354/400, 402, 354/409, 412, 471, 474, 475

[56] References Cited

U.S. PATENT DOCUMENTS 5,235,380 8/1993 Yamada et al. ............... 354/409 X
5,305,045 4/1994 Terada ........................... 354/400

Primary Examiner—W. B. Perkey
Attorney, Agent, or Firm—Oliff & Berridge

[57] ABSTRACT

When a preparation for photography signal is input from a release switch assembly without said photography command signal being input therefrom, the brightness of an object to be photographed is measured and an exposure value is calculated therefrom, the focus adjustment state of the photographic lens is detected, and these values are displayed. At the time point when this display operation has been completed, if and only if the preparation for photography signal is still being input from the release switch assembly, focus adjustment of the photographic lens is performed based upon the detected focus adjustment state. Further, when the photography command signal is input from the release switch assembly without any substantial time lapse after the preparation for photography signal is input therefrom, the brightness of the object to be photographed is measured and an exposure value is calculated therefrom, the focus adjustment state of the photographic lens is detected, thereafter focus adjustment of the photographic lens is performed, and thereafter exposure of the film is performed according to the exposure value.

6 Claims, 7 Drawing Sheets

CAMERA

BACKGROUND OF THE INVENTION

1. Field of the Invention

The present invention relates to a camera which selectively performs several different combinations of the operations of photometry, distance measurement, display, focus adjustment, and exposure, according to the method in which a shutter release button is operated.

2. Description of the Related Art

A camera which executes the operation of preparing for photography when a shutter release button thereof is depressed partially as far as a first stroke position thereof and which exposes a film frame to actually perform photography when the shutter release button is depressed fully as far as a second stroke position thereof is per se known.

The operations which may be performed as preparation for photography include but are not limited to: photometry, measuring the photographic distance or focus adjustment detection operation, display actuation, and the like. The operation of photometry typically includes measuring the brightness level of the object to be photographed, calculating an exposure value based upon the brightness level of the object to be photographed and upon the sensitivity of the film which is currently loaded in the camera, and determining upon the most suitable combination of iris opening (aperture) and shutter speed based upon the calculated exposure value. The operation of measuring the photographic distance consists of the operation of detecting the photographic distance to the object to be photographed, while the operation of focus adjustment detection consists of detecting the focus adjustment state of the photographic lens. And the operation of display actuation consists of the actuation of an external display device or of a display device provided within the viewfinder of the camera, so as to display to the camera user the values of iris opening and/or shutter speed and the like which have been determined based upon the operation of photometry.

Further, a camera is per se known which also performs the operation of focus adjustment of the photographic lens during the above described first stage of preparation for photography, i.e. while the shutter release button is being depressed to its first stroke position, in order to shorten the shutter release time lag from the time point at which the shutter release button is first depressed all the way to its second stroke position to the time at which the action of exposure of the film frame actually starts. This operation of focus adjustment of the photographic lens consists of driving the photographic lens axially to an appropriate position for providing proper focusing, according to the photographic distance which is determined as a result of the photographic distance measurement operation or according to the defocusing amount which is determined as a result of the operation of focus adjustment detection.

With these types of prior art camera, when the shutter release button is depressed by the camera user quickly in one stroke all the way down to its second stroke position, i.e. through the first stroke position thereof without substantially pausing there, then the operation of exposing the film is only performed after all of the photographic preparation operations of photometry, measuring the photographic distance or focus adjustment detection operation, display actuation, focus adjustment, and the like have been completed.

SUMMARY OF THE INVENTION

The objective of the present invention is to provide a camera which alters the operation which is performed in preparation for photography according to the method in which its shutter release button is operated, and with which thereby the operation of preparation for photography can be selected.

This aspect of the present invention is applicable to a camera which comprises: a photographic lens; a shutter release button; a photometric device which measures the brightness of an object to be photographed, and which calculates an exposure value based upon this measured brightness; a focus detection device which detects the focus adjustment state of said photographic lens; a lens drive device which performs focus adjustment of said photographic lens based upon the focus adjustment state detected by said focus detection device; a display device which displays said exposure value calculated by said photometric device and said focus adjustment state detected by said focus detection device; and a release switch assembly which outputs a preparation for photography signal when said shutter release button is depressed as far as a first stroke position thereof, and which outputs a photography command signal when said shutter release button is depressed past said first stroke position as far as a second stroke position thereof which is further than said first stroke position.

And, in order to attain the above described objective, this aspect of the present invention further provides, incorporated in such a camera, a control device which: when said preparation for photography signal is input from said release switch assembly without said photography command signal being input therefrom, controls said photometric device to calculate said exposure value and controls said focus detection device to detect the focus adjustment state of said photographic lens, and then controls said display device to display said exposure value and said focus adjustment state; and, at the time point when this display of said exposure value and said focus adjustment state has been completed, if and only if said preparation for photography signal is still being input from said release switch assembly, controls said lens drive device to perform focus adjustment of said photographic lens.

According to this aspect of the present invention as described above, when the preparation for photography signal is input from the release switch assembly without said photography command signal being input therefrom, the exposure value is calculated and the focus adjustment state is detected and these are displayed, and focus adjustment of the photographic lens is performed if and only if the preparation for photography signal is still being input at the time point when this display operation has been completed; while, if at this time point the preparation for photography signal is no longer being input, focus adjustment of the photographic lens is not performed. By doing this, the operation of preparation for photography can be selected according to the manner in which the shutter release button is operated, and if, in order to check upon the exposure value, the shutter release button is only depressed as far as its first stroke position for an instant and is then released, the operation of focus adjustment of the photographic lens is eliminated, so that electrical power is saved, thus reducing the consumption of the battery.

A further objective of the present invention is to provide a camera which alters the operation which is performed in preparation for photography according to the method of operation of its shutter release button, and with which thereby the time lag for shutter release operation is reduced.

This aspect of the present invention is applicable to a camera which comprises: a photographic lens; a shutter release button; a photometric device which measures the brightness of an object to be photographed, and which calculates an exposure value based upon this measured brightness; a focus detection device which detects the focus adjustment state of said photographic lens; a lens drive device which performs focus adjustment of said photographic lens based upon the focus adjustment state detected by said focus detection device; a display device which displays said exposure value calculated by said photometric device and said focus adjustment state detected by said focus detection device; an exposure device which exposes a film according to said exposure value calculated by said photometric device; and a release switch assembly which outputs a preparation for photography signal when said shutter release button is depressed as far as a first stroke position thereof, and which outputs a photography command signal when said shutter release button is depressed past said first stroke position as far as a second stroke position thereof which is further than said first stroke position.

And, in order to attain the above described objective, this aspect of the present invention further provides, incorporated in such a camera, a control device which: when said photography command signal is input from said release switch assembly without any substantial time lapse after said preparation for photography signal is input therefrom, controls said photometric device to calculate said exposure value and controls said focus detection device to detect the focus adjustment state of said photographic lens, thereafter controls said lens drive device to perform focus adjustment of said photographic lens, and thereafter controls said exposure device to expose said film.

According to this aspect of the present invention as described above, when the photography command signal is input from the release switch assembly without any substantial time lapse after the preparation for photography signal is input therefrom, the exposure value is calculated and the focus adjustment state is detected but these are not displayed, and instead focus adjustment of the photographic lens is immediately performed, after which exposure action is performed. By doing this, the operation of preparation for photography can be selected according to the manner in which the shutter release button is operated, and if the shutter release button is depressed quickly in one stroke all the way down to its second stroke position without any pause at its first stroke position, in order to take a photograph quickly (a so called "snap" or quick response shot), the operation of displaying the exposure value and the focus adjustment state is eliminated. Thereby, the quick response action of the camera is enhanced, and the time lag for shutter release operation is reduced. This helps to ensure that opportunities for quick photography are not lost.

DETAILED DESCRIPTION OF THE PREFERRED EMBODIMENT

Figure 1:
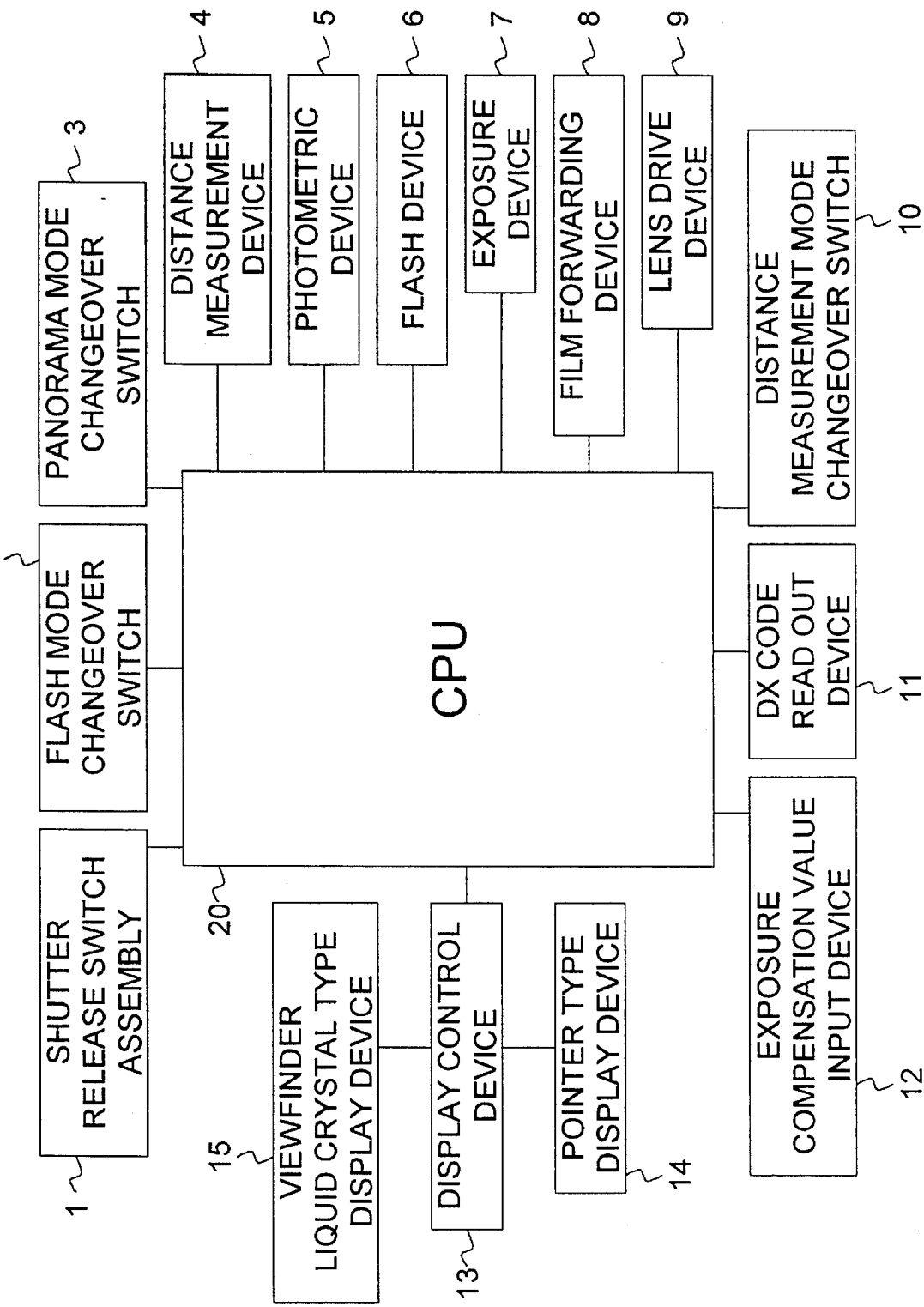
FIG. 1 is a block diagram showing the construction of the preferred embodiment of the camera of the present invention.
Figure 2:
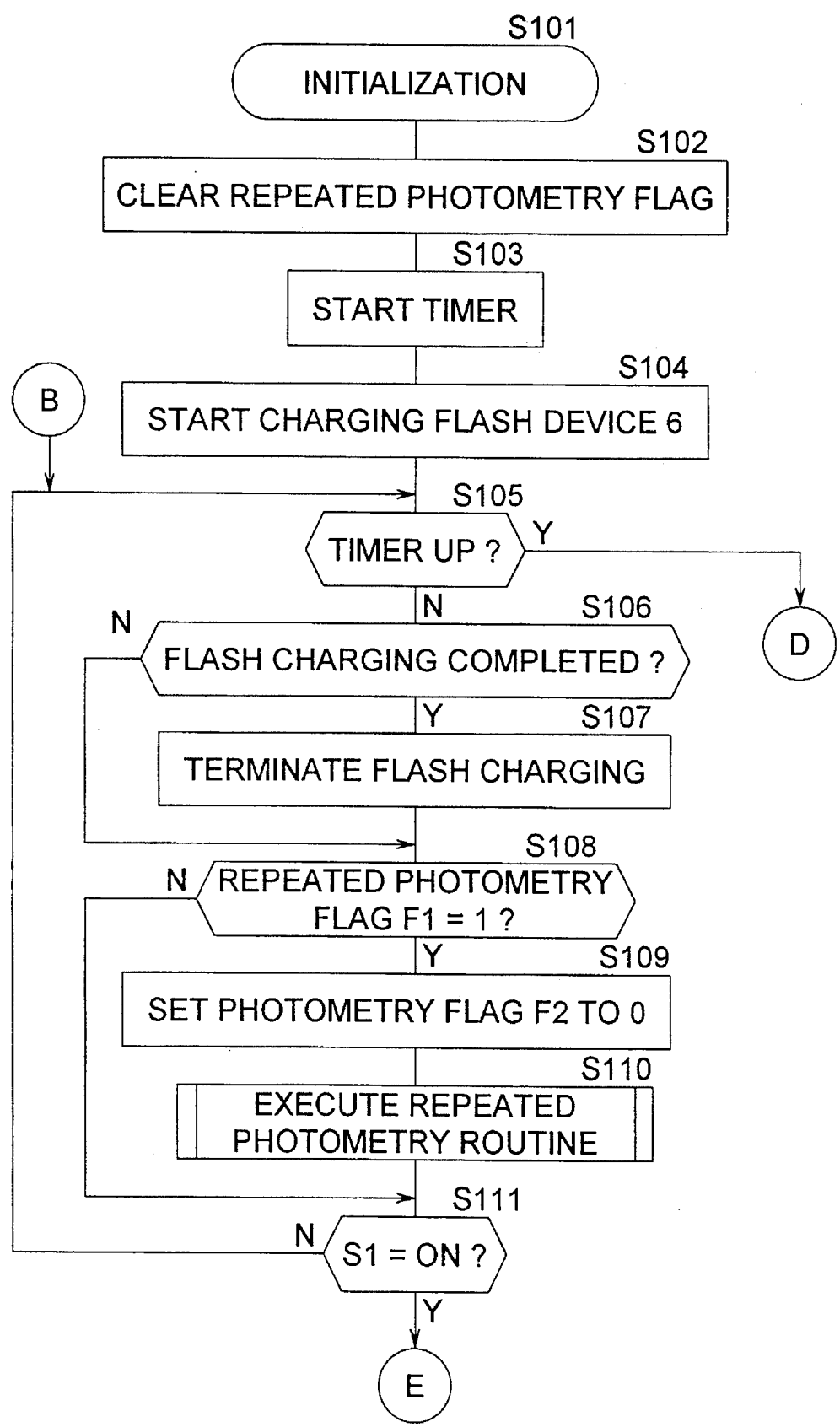
FIGS. 2 through 5 are flow charts showing the operation of a main program which is executed by a central processing unit incorporated in this camera of the preferred embodiment.
Figure 3:
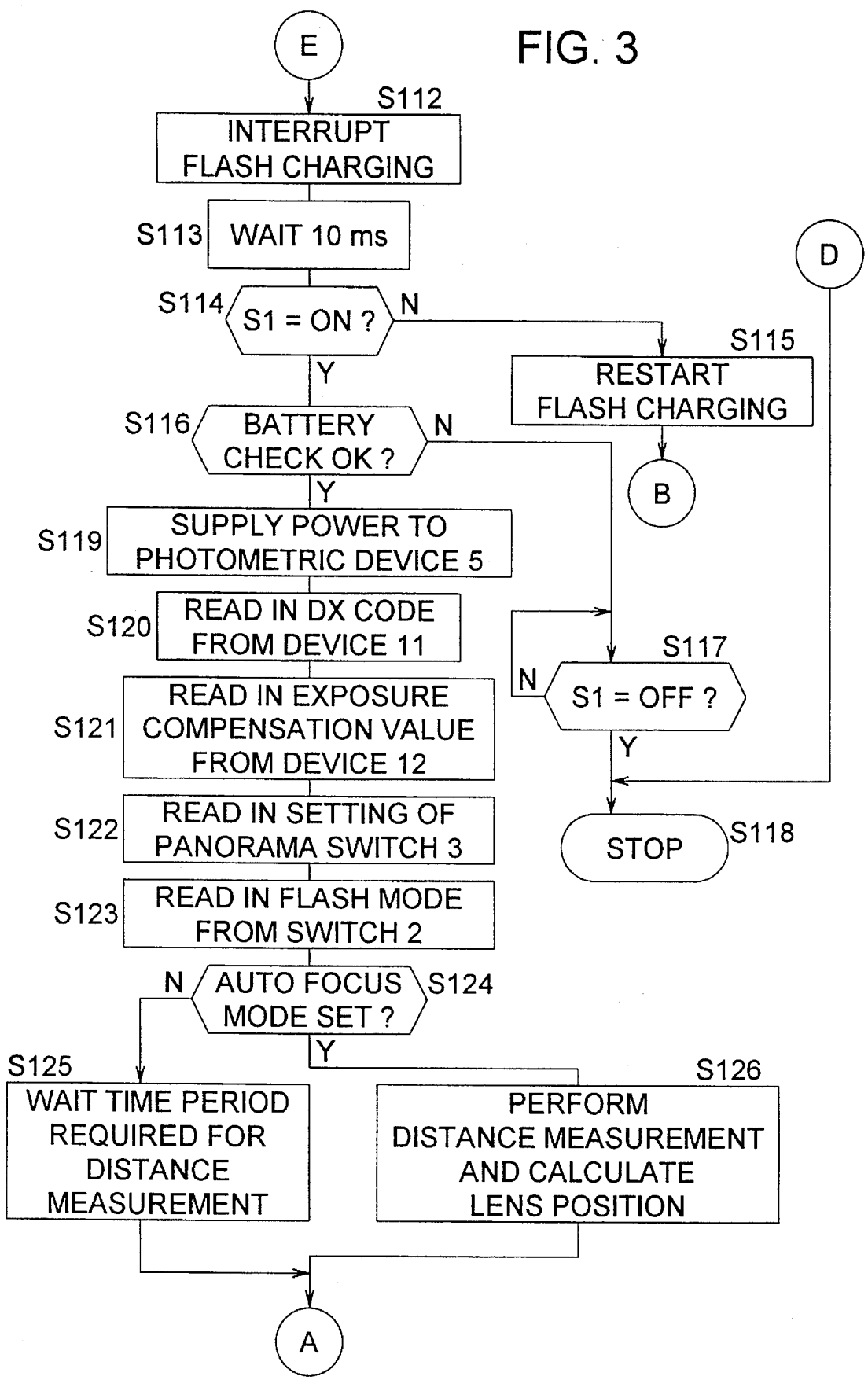
Figure 4:
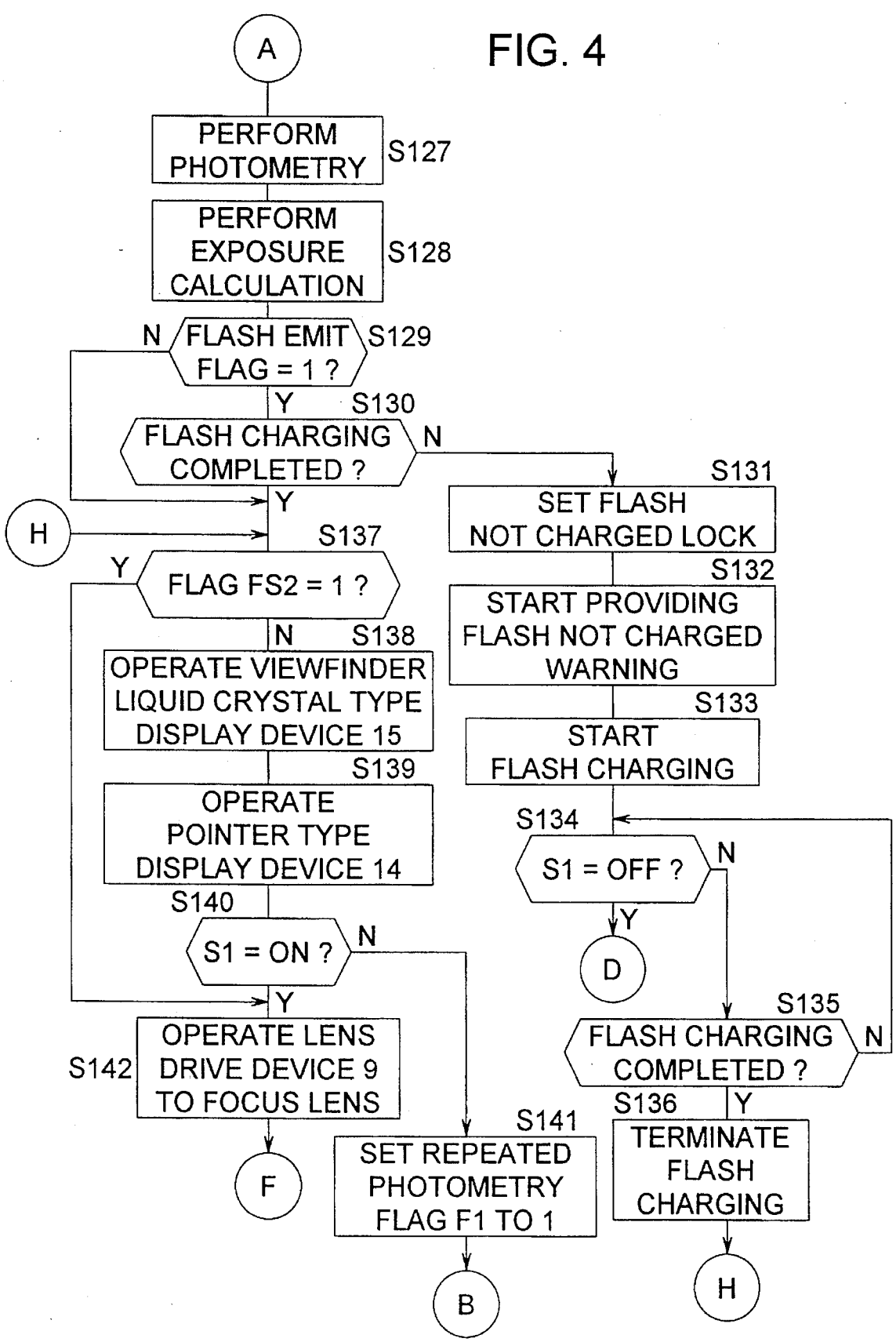
Figure 5:
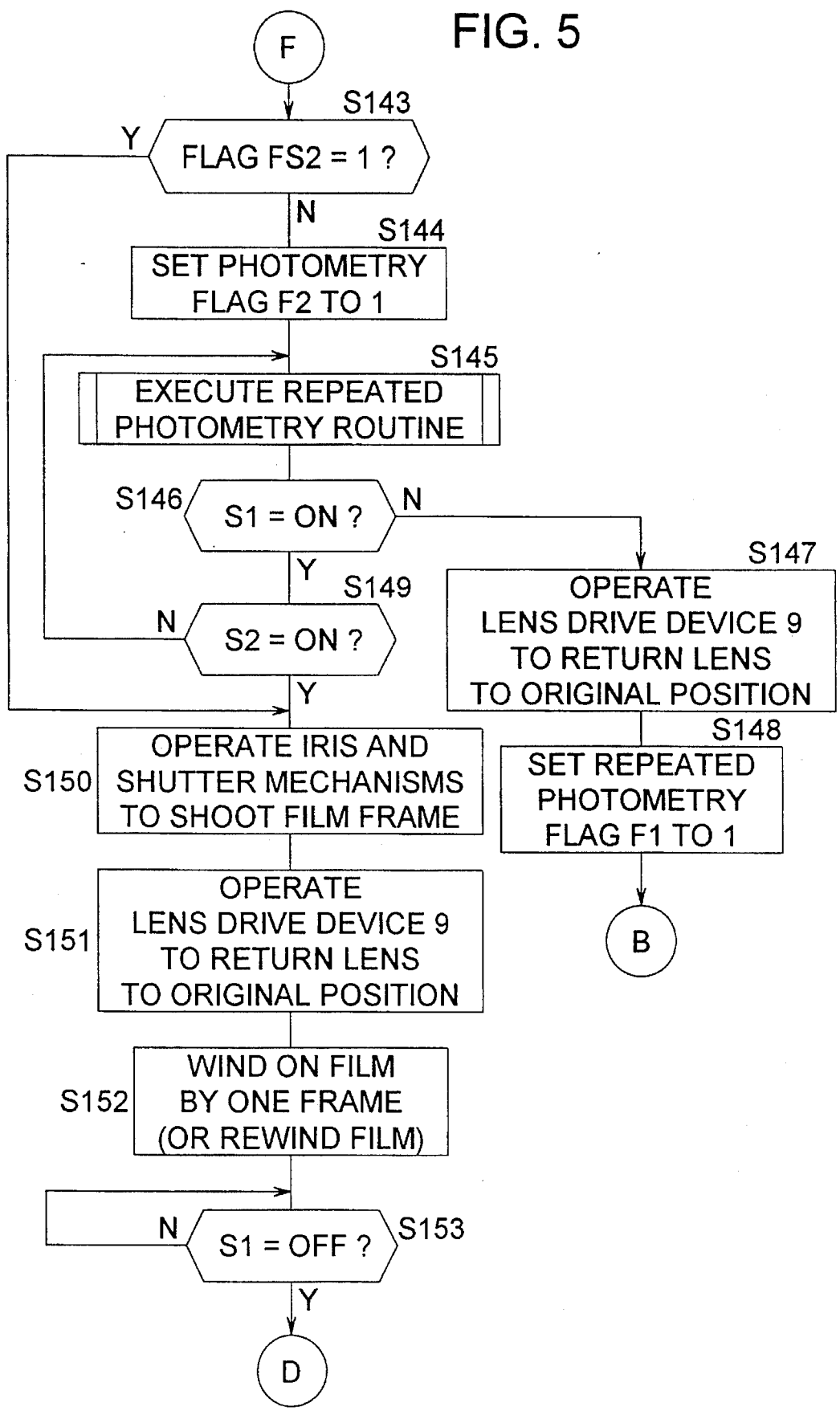

The preferred embodiment of the present invention will now be explained with reference to the figures. FIG. 1 is a block diagram showing the construction of the preferred embodiment of the camera of the present invention. In this figure the reference numeral 1 denotes a shutter release switch assembly which is turned on and off by the operation of a shutter release button not particularly shown in the figures, and which outputs information regarding this shutter release button operation to a central processing unit (hereinafter abbreviated as "CPU") 20. In detail, when the shutter release button is initially depressed through a first stroke position thereof a preparation for photography signal S1 is output from the shutter release switch assembly 1, while when the shutter release button is further fully depressed as far as a second stroke position thereof a photography command signal S2 is output from the shutter release switch assembly 1. A flash mode changeover switch 2 is actuated by the operation of a flash mode setting button not particularly shown in the figures, and outputs information regarding flash mode setting to the CPU 20. The flash mode can thereby be set to any one of various flash modes which may typically include the following: an automatic flash mode in which light for flash illumination is automatically emitted by a flash device 6 according to the level of illumination of the object to be photographed; a forced flash mode in which light is forcibly emitted by the flash device 6; a flash inhibited mode in which emission of light by the flash device 6 is prohibited; and a red eye diminution mode in which the flash device 6 is so controlled as to moderate occurrence of the so called red eye phenomenon. And a panorama mode changeover switch 3 is actuated by the operation of a panorama mode changeover button not particularly shown in the figures, and outputs information to the CPU 20 as to whether the panorama photography mode or the normal photography mode is set.

A distance measurement device 4 detects the distance to the object to be measured and outputs this distance to the CPU 20 as information for focus adjustment. Various per se known types of distance measurement device may be used for implementing this distance measurement device 4, either of the so called passive type or of the so called active type. For example, a sonar focusing type of distance measurement device may be used; or one of the contrast type or of the phase difference type which detects the focus adjustment state of the photographic lens (not particularly shown) of the camera and outputs a signal representative of the amount of defocusing thereof. A photometric device 5 performs photometry upon the photographic field and detects the brightness level of the object to be photographed, and outputs information relating thereto to the CPU 20. A flash device 6 is controlled by the CPU 20 so as, when actuated for flash photography, to emit light for additionally illumination of the photographic field. An exposure device 7 drives the iris (not particularly shown) of the photographic lens and drives a shutter (also not shown) of a shutter mechanism so as to expose the film, based upon a desired iris opening (aperture) and a desired shutter speed which have been set or which have been determined upon based upon the brightness level of the object to be photographed and upon the sensitivity of the film which is currently loaded in the camera. A film forwarding device 8 automatically winds on the film to its first frame when the film is first loaded into the camera, and thereafter each time a frame is shot winds on the film by one frame until the last frame on the film has been shot, whereupon it rewinds the film. And a lens drive device 9 performs focus adjustment of the photographic lens based upon the distance to the object to be photographed as detected by the distance measurement device 4.

A distance measurement mode changeover switch 10 is actuated by the operation of a distance measurement mode changeover button not particularly shown in the figures, and outputs information to the CPU 20 as to which of an automatic focus mode, a forced infinite focus mode, and a manual focus mode is set. A DX code read out device 11 reads out the DX code on a film loaded into the camera and outputs a sensitivity information signal to the CPU 20. An exposure compensation value input device 12 is a device for inputting an exposure compensation value for the exposure value which is calculated based upon the result of photometric measurement of the brightness value of the object to be photographed and upon the film sensitivity. And a display control device 13, according to command signals which it receives from the CPU 20, controls a pointer type display device 14 and a viewfinder liquid crystal type display device 15, so as to display various information upon these two display devices.

The CPU 20 is of a per se conventional type which incorporates a memory and various associated circuitry, and it inputs and outputs various items of information between itself and the various mechanisms 1 through 13 described above and executes various calculations, as well as performing overall sequence control for the camera as a whole.

Figure 6:
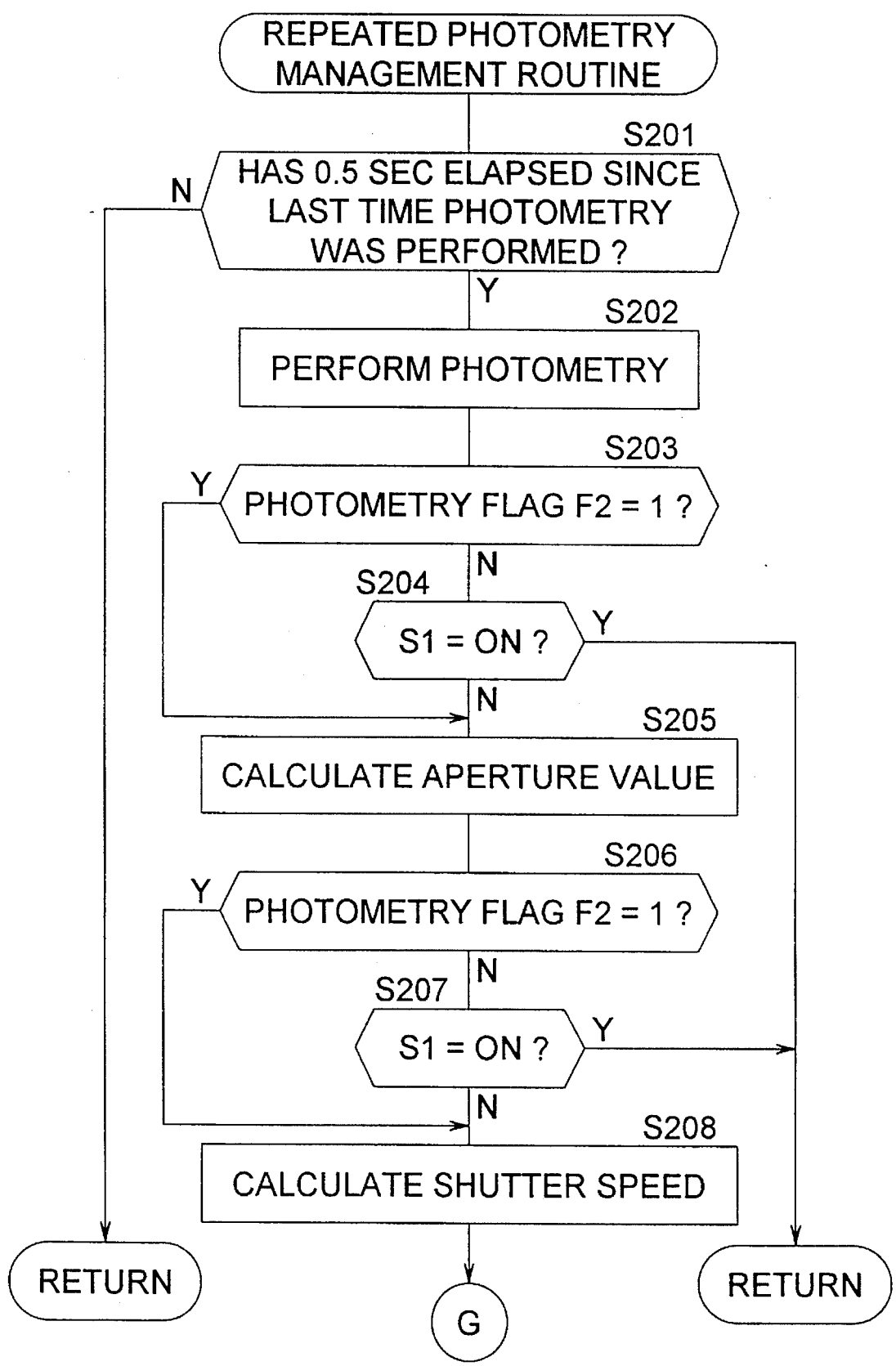
FIGS. 6 and 7 are flow charts showing the operation of a repeated photometry management routine which is executed by this central processing unit.
Figure 7:
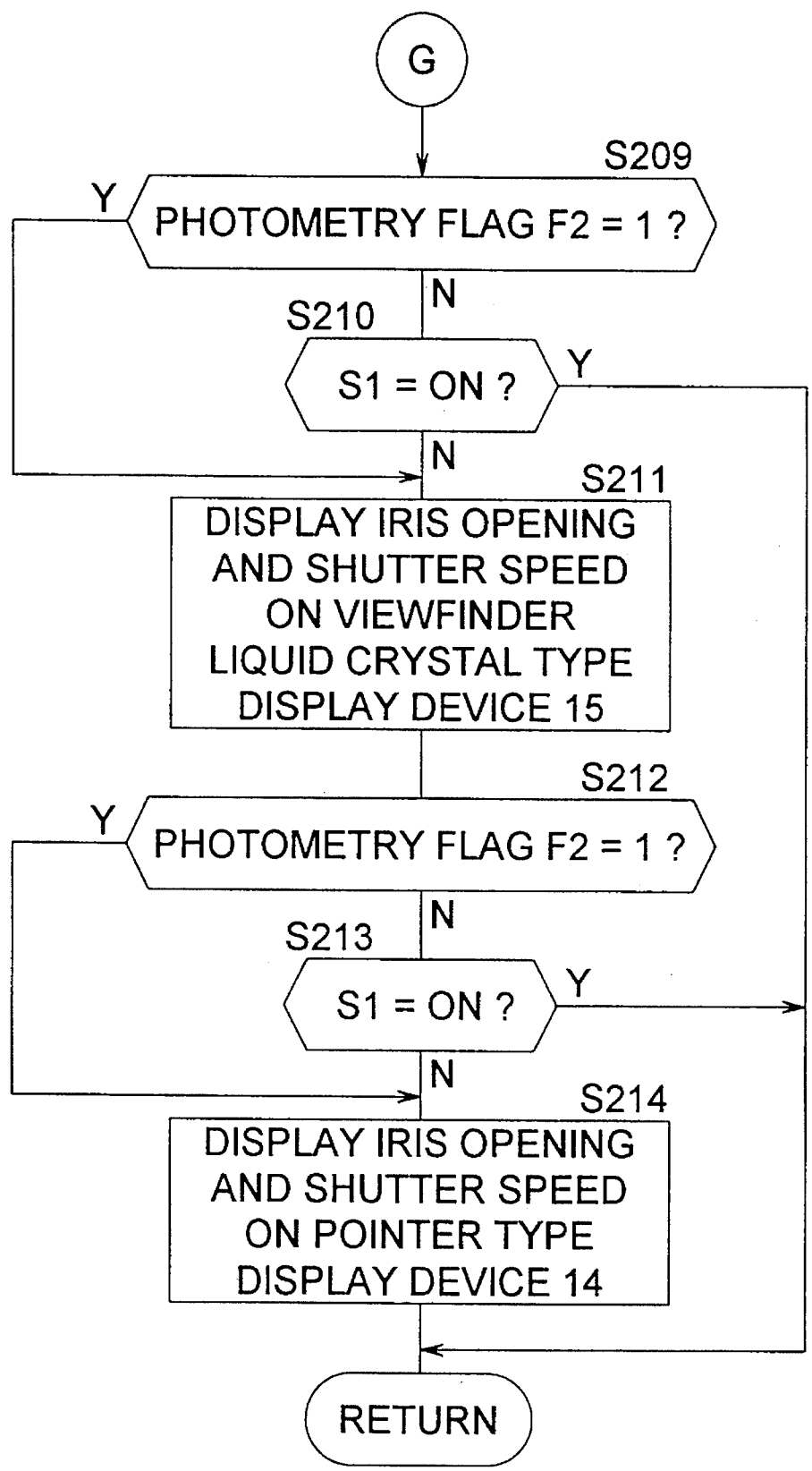

Next, referring to FIGS. 2 through 5 which are flow charts showing the operation of a main program which is executed by the CPU 20, and FIGS. 6 and 7 which are flow charts showing the operation of a repeated photometry management routine which is executed by this CPU 20, the operation of this camera according to the preferred embodiment of the present invention will be explained.

In the step S101, the power source of the camera is turned on, and when the shutter release button is depressed as far as its first stroke position the CPU 20 receives the preparation for photography signal S1 from the shutter release switch assembly 1, and commences to execute the main program whose flow charts are shown in FIGS. 2 through 5. In the step S102, the value of a flag F1 which indicates repeated photometry is cleared. During the preparation for photography condition, if the value of this repeated photometry flag F1 is 1, photometry is repeatedly performed once every 0.5 seconds. In the step S103 a timer is started and the flow of control proceeds to the step S104, in which a charge command is output to the flash device 6 so that charging thereof is commenced. In the next step S105, a decision is made as to whether or not the time interval being timed by the timer has elapsed yet, and if the time is up then the flow of control is transferred to the step S118 and execution is terminated, while if the time is not yet up then the flow of control continues to the step S106.

In the step S106, a decision is made as to whether or not the charging of the flash device 6 has been completed, and if the charging has been completed then the flow of control continues to the step S107 in which this charging is terminated, while if charging has not yet been completed then the flow of control skips this step S107 and is transferred directly to the step S108. In the step S108, a decision is made as to whether or not the value of the repeated photometry flag F1 is 1, and if the repeated photometry flag F1 is 1 then the flow of control proceeds to the step S109, while if the flag F1 is not set then the flow of control is transferred to the step S111. Since directly after the power to the camera is turned on the value of this flag F1 is cleared in the step S102, the flow of control passes to the step S111 at this time. Moreover, when in the step S108 it is detected that the value of this repeated photometry flag F1 is 1, the photometry flag F2 is cleared in the step S109, and in the next step S110 the repeated photometry management routine whose flow chart is shown in FIGS. 6 and 7 is repeatedly executed, so that photometry is performed repeatedly once every 0.5 seconds, as will be explained hereinafter.

In the step S111, a decision is made as to whether or not the preparation for photography signal S1 has been input (hereinafter this will be expressed as "the signal S1 is on") indicating that the shutter release button of the camera has been depressed as far as its first stroke position, and if the signal S1 has been input then the flow of control is transferred to the step S112, while otherwise the flow of control loops back to the step S105. In the step S112 the charging of the flash device 6 is interrupted, and in the next step S113 a period of approximately 10 ms is allowed to elapse. In the step S114, again just as in the step S111, an identical decision is made as to whether or not the preparation for photography signal S1 has been input indicating that the shutter release button of the camera has being depressed as far as its first stroke position (this repetition of testing after the time period of 10 ms has elapsed is in order to avoid erroneous operation caused by chattering of the shutter release switch assembly 1), and if the signal S1 is confirmed as again input then the flow of control proceeds to the step S116, while otherwise the flow of control is transferred to the step S115, in which the charging of the flash device 6, which was interrupted in the step S112, is again restarted, and then the flow of control returns to the step S105, so that until the timer is up the above described program steps S105 through S111 are repeatedly executed, while when the timer is up program execution is terminated at the step S118.

If on the other hand in the step S114 it is confirmed that the signal S1 has again been input, then in the step S116 the voltage of the battery is measured and is compared with a reference voltage value, and a decision is made as to whether or not the battery voltage is adequate for performing photography. If the battery voltage is higher than the reference voltage value then the flow of control is transferred to the step S119, while if the battery voltage is lower than the reference voltage value then the flow of control is transferred to the step S117. When the battery voltage is not adequate for performing photography, in the step S117 the CPU 20 loops around in a tight loop waiting until the preparation for photography signal S1 goes off to indicate that the shutter release button of the camera is no longer being depressed as far as its first stroke position, and then the flow of control proceeds to the step S118 in which program execution is terminated.

On the other hand, if the battery voltage is determined as being adequate for performing photography, then in the step S119 power is supplied to the photometric device 5, and in the next step S120 the DX code read out device 11 is operated and the DX code of the film which is loaded in the camera is read in to the memory. Next in the step S121 the exposure compensation value set by the use of the exposure compensation value input device 12 is read in, and in the next step S122 the setting of the panorama mode changeover switch 3 is read, in order to determine whether the panorama photography mode or the normal photography mode is set. Then in the step S123 the flash mode is read in from the setting of the flash mode changeover switch 2.

In the step S124, a decision is made based upon the output from the distance measurement mode changeover switch 10 as to whether or not the auto focus mode is set, and if the auto focus mode is set then the flow of control is transferred to the step S126, while if the auto focus mode is not set then the flow of control is transferred to the step S125. If the auto focus mode is set, then in the step S126 the distance measurement device 4 is operated so as measure the photographic distance of the object to be photographed, and then an amount of projection for the photographic lens is calculated based upon this measured photographic distance, and the flow of control proceeds to the step S127. On the other hand, if the auto focus mode is not set focusing mode which accordingly must be the forced infinite focus mode or the manual focus mode, then in the step S125 the system waits for a certain delay time period just adequate for measuring the photographic distance if in fact the auto focus mode had been set, and then the flow of control proceeds to the step S127. Now, this delay time period is the time period which is required for the operation of the photometric device 5 to become stabilized after the power supply thereto has been turned on in the step S119 described above. When the operation of the photometric device 5 has thus stabilized, in the step S127 photometry is performed, and next in the step S128 exposure calculation is performed based upon the brightness of the object to be photographed which is obtained as a result of this photometry and upon the sensitivity of the film, and an appropriate iris opening and shutter speed are determined upon.

In the step S129 a decision is made as to whether or not the flash emit flag is set to 1. This flash emit flag is set to 1 if either in the step S123 above it was determined that forced flash mode was set or in the steps S127 and S128 above it was determined as a result of the photometric operation and the exposure calculation that operation of the flash device 6 was required in order to supplement the illumination for the present film frame. When the flash emit flag is 1 the flow of control is transferred to the step S130, in which a decision is made as to whether or not the charging of the flash device 6 has yet been completed, and if the flash device 6 has been fully charged then the flow of control is transferred to the step S137, while otherwise the flow of control is transferred to the step S131. Here in this step S131, if charging of the flash device 6 has not been completed, a not charged lock is set and further photographic operation is prevented, and in the next step S132 a "flash not charged" warning is started to be provided upon the viewfinder liquid crystal type display device 15. Further, in the step S133, the charging of the flash device 6 is started. After this, in the step S134, a decision is made as to whether or not the preparation for photography signal S1 has gone off which indicates that the depression of the shutter release button as far as its first stroke position has been terminated, and if the signal S1 is off then the flow of control proceeds to the step S118 in which program execution is terminated, while if depression of the shutter release button as far as its first stroke position has not yet been terminated then the flow of control is transferred to the step S135, in which a decision is made as to whether or not the charging of the flash device 6 has yet been completed. If the flash device 6 has not yet been fully charged then the flow of control loops back to the step S134 again to continue the charging process, while when it is determined that the flash device 6 has become fully charged then in the step S136 the charging of the flash device 6 is terminated, and the flow of control proceeds to the step S137.

On the other hand, if in the step S129 it is detected that the repeated photometry flag is not set to 1, or if in the step S130 it is detected that the flash device 6 has been fully charged, then the flow of control is transferred to the step S137, in which a decision is made as to whether or not a photography command flag FS2 has been set to 1. This flag FS2 is set to 1 when the photography command signal S2 has been input indicating that the shutter release button of the camera has been depressed all the way to its second stroke position, and is cleared to 0 when photography has been completed. If the flag FS2 is 1 then the flow of control is transferred to the step S142, while if the flag FS2 is 0 then the flow of control proceeds to the step S138.

In the step S138 various items of information related to photography such as the result of distance measurement, the iris opening, the shutter speed, and the like are displayed upon the viewfinder liquid crystal type display device 15; and in the next step S139 these items of photographic information are displayed upon the pointer type display device 14. In the step S140 a decision is made as to whether or not the preparation for photography signal S1 has been input, and if the signal S1 has been input then the flow of control is transferred to the step S142, while otherwise the flow of control is transferred to the step S141. In the step S141 the repeated photometry flag F1 is set to 1 and then the flow of control returns to the step S105, so that the above described processing is repeated. However this time around, since the repeated photometry flag F1 is set to 1, the flow of control passes from the step S108 through the steps S109 and S110, so that the repeated photometry management routine whose flow chart is shown in FIGS. 6 and 7 is executed and the photometry flag F2 is cleared to 0.

When it is determined in the step S137 that the photography command flag FS2 is set to 1, or when after performing in the steps S138 and S139 the display operations described above it is determined that the preparation for photography signal S1 has been input, then in the step S142 the lens drive device 9 is operated so as to axially propel the photographic lens to the appropriate position for focusing, which is the position calculated in the step S126 if the automatic focus mode is set by the distance measurement mode changeover switch 10, or is an axial position overridingly determined by the camera user if the forced infinite focus mode or the manual focus mode is set; and then the flow of control proceeds to the step S143. In the step S143, again a decision is made as to whether or not the photography command flag FS2 has been set to 1 so as to indicate that the shutter release button of the camera has been depressed all the way to its second stroke position, and if the flag FS2 is set to 1 then the flow of control is transferred to the step S150, while otherwise then the flow of control proceeds to the step S144. When the flag FS2 is not set to 1, i.e. when shutter release action is not being commanded, then in the step S144 the photometry flag F2 is set to 1, and in the next step S145 the repeated photometry management routine whose flow chart is shown in FIGS. 6 and 7 is executed so that photometry is performed repeatedly once every 0.5 seconds, as will be explained hereinafter. In the step S146, a decision is made as to whether or not the preparation for photography signal S1 has been input (i.e., is on), and if the signal S1 has been input then the flow of control is transferred to the step S149, while otherwise the flow of control is transferred to the step S147. In the step S149, a decision is made as to whether or not the photography command signal S2 has been input, and if the signal S2 has been input then the flow of control is transferred to the step S150, while otherwise then the flow of control loops back to the step S145 again. In other words, the repeated photometry management routine is executed repeatedly for as long as the preparation for photography signal S1 is being input while the photography command signal S2 is not being input. When in the step S146 it is determined that the preparation for photography signal S1 has not been input, then in the step S147 the lens drive device 9 is operated so as to axially propel the photographic lens back to its original position, and in the next step S148 the repeated photometry flag F1 is set to 1 and then the flow of control returns to the step S105, so that the above described processing is repeated. However this time around, since the repeated photometry flag F1 is set to 1, the flow of control passes from the step S108 through the steps S109 and S110, so that the repeated photometry management routine whose flow chart is shown in FIGS. 6 and 7 is executed and subsequently the photometry flag F2 is cleared to 0. After this photometry is repeatedly performed until either in the step S105 it is determined that the time being timed by the timer has expired, or in the step S111 it is determined that the preparation for photography signal S1 has been input.

When in the step S143 it is determined that the photography command flag FS2 has been set to 1, or in the step S149 it is determined that the photography command signal S2 is on, then the flow of control is transferred to the step S150, in which the exposure device 7 is operated so as to drive the iris mechanism and the shutter mechanism so as to expose the film with the desired iris aperture value and the desired shutter speed which have been determined upon as the results of the exposure calculation process. At this time the flash device 6 is controlled to emit flash illumination if a flash emit flag is set to 1. When exposure has been completed the flow of control proceeds to the step S151, in which the lens drive device 9 is operated so as to axially propel the photographic lens back to its original position, and in the next step S152 the film forwarding device 8 is actuated so as to wind on the film by one frame, unless this has been the last frame on the film, in which case it rewinds the film. And in the last step S153 the system waits in a tight loop until the first stroke operation of the shutter release button is terminated, i.e. until the preparation for photography signal S1 goes to off; and then the flow of control is returned to the step S118 and program execution is terminated.

Next, referring to FIGS. 6 and 7, the operation of the repeated photometry management routine will be explained. In the step S201, a decision is made as to whether or not a time period of 0.5 seconds has yet elapsed since the previous time that photometry was performed, and if this time period has not yet elapsed then the flow of control is returned to the main program, while if now 0.5 seconds have elapsed since the last performance of photometry then the flow of control is transferred to the step S202, in which the photometric device 5 is actuated so as to perform photometry. In the step S203 a decision is made as to whether or not the photometry flag F2 is set to 1, and if the flag F2 is set to 1 then the flow of control skips to the step S205, while if this flag F2 is not set to 1 then the flow of control proceeds to the step S204. In the step S204 a decision is made as to whether or not the preparation for photography signal S1 is on, and if the signal S1 is on then the flow of control returns to the main program, while otherwise the flow of control proceeds to the step S205. In the step S205 aperture value calculation is performed based upon the brightness of the object to be photographed which is obtained as a result of the photometry and upon the sensitivity of the film, and an iris opening is obtained, and the flow of control proceeds to the step S206. In the step S206 a decision is made as to whether or not the photometry flag F2 is set to 1, and if the flag F2 is set to 1 then the flow of control skips to the step S208, while if this flag F2 is not set to 1 then the flow of control proceeds to the step S207. In the step S207 a decision is made as to whether or not the preparation for photography signal S1 is on, and if the signal S1 is on then the flow of control returns to the main program, while otherwise the flow of control proceeds to the step S208. In the step S208 shutter speed calculation is performed based upon the brightness of the object to be photographed which is obtained as a result of the photometry and upon the sensitivity of the film, and a shutter speed is obtained, and the flow of control proceeds to the step S209.

In the step S209 a decision is made as to whether or not the photometry flag F2 is set to 1, and if the flag F2 is set to 1 then the flow of control skips to the step S211, while if this flag F2 is not set to 1 then the flow of control proceeds to the step S210. In the step S210 a decision is made as to whether or not the preparation for photography signal S1 is on, and if the signal S1 is on then the flow of control returns to the main program, while otherwise the flow of control proceeds to the step S211. In the step S211 the calculated iris opening and the calculated shutter speed are displayed upon the viewfinder liquid crystal type display device 15. In the step S212 a decision is made as to whether or not the photometry flag F2 is set to 1, and if the flag F2 is set to 1 then the flow of control skips to the step S214, while if this flag is not set to 1 then the flow of control proceeds to the step S213. In the step S213 a decision is made as to whether or not the preparation for photography signal S1 is on, and if the signal S1 is on then the flow of control returns to the main program, while otherwise the flow of control proceeds to the step S214. In the step S214 the calculated iris opening and the calculated shutter speed are displayed upon the pointer type display device 14; and then the flow of control returns to the main program.

Thus it is seen with the camera of the preferred embodiment of the present invention as described above that, when the shutter release button of the camera is depressed as far as its first stroke position and the preparation for photography signal S1 is input to the CPU 20 from the shutter release switch assembly 1, then in the step S126 distance measurement is performed, in the next step S127 photometry is performed, and further in the next step S128 an exposure value is calculated based upon the result of photometry. Further, after in the steps S138 and S139 the exposure value and the result of distance measurement have been displayed upon the two displays 14 and 15, if in the step S140 it is determined that the shutter release button of the camera is still being depressed as far as its first stroke position so that the preparation for photography signal S1 is still being input, then the flow of control is transferred to the step S142, in which focusing adjustment of the photographic lens is performed; while, on the other hand, if in the step S140 it is determined that the shutter release button of the camera is no longer being depressed as far as its first stroke position so that the preparation for photography signal S1 is no longer being input, then the flow of control is transferred to the step S105 and the following, in which the action of photometry is repeated. By doing this, if the user of the camera only depresses the shutter release button as far as its first stroke position for a brief instant in order to check upon the exposure value, the action of adjusting the photographic lens to focus it is eliminated, which is effective for saving electrical power and thus reducing the consumption of the battery.

Further, with the camera of the preferred embodiment of the present invention as described above, if the user of the camera depresses the shutter release button quickly in one stroke all the way down to its second stroke position, i.e. through the first stroke position thereof without substantially pausing there, so that immediately after the preparation for photography signal S1 is input to the CPU 20 from the shutter release switch assembly 1 the photography command signal S2 is input therefrom, then the operations in the steps S138 and S139 of displaying the exposure value and of the result of distance measurement upon the two displays 14 and 15 are eliminated, and the flow of control is transferred from the step S137 directly to the step S142 so as to perform focusing adjustment of the photographic lens. Further, the process of repeated photometry performed in the step S145 is eliminated, and the flow of control is transferred from the step S143 directly to the step S150 so as to perform exposure action. By doing this, when the shutter release button is depressed quickly in one stroke all the way down to its second stroke position, the action of displaying the exposure value and the result of distance measurement upon the two displays is eliminated, and, after the actions of distance measurement and photometry have been performed in preparation for photography, the actions of focus adjustment and of exposure of a film frame are performed immediately and at once. Thereby the time period taken from the instant that the photographer presses the shutter release button in this manner until the instant of actual shutter release is reduced as compared with the prior art, and accordingly the quick response action of the camera is enhanced. This helps to ensure that opportunities for quick photography, i.e. for obtaining so called "snap" or quick response shots, are not lost.

Although the present invention has been shown and described in terms of a preferred embodiment thereof, it is not to be considered as limited by any of the perhaps quite fortuitous details of said embodiment or of the drawings, but only by the terms of the appended claims, which follow.

We claim:

1. A camera comprising:

a photographic lens;

a shutter release button;

a photometric device which measures the brightness of an object to be photographed, and which calculates an exposure value based upon this measured brightness;

a focus detection device which detects the focus adjustment state of said photographic lens;

a lens drive device which performs focus adjustment of said photographic lens based upon the focus adjustment state detected by said focus detection device;

a display device which displays said exposure value calculated by said photometric device and said focus adjustment state detected by said focus detection device; and:

a release switch assembly which outputs a preparation for photography signal when said shutter release button is depressed as far as a first stroke position thereof, and which outputs a photography command signal when said shutter release button is depressed past said first stroke position as far as a second stroke position thereof which is further than said first stroke position;

characterized by further comprising a control device which:

when said preparation for photography signal is input from said release switch assembly without said photography command signal being input therefrom, controls said photometric device to calculate said exposure value and controls said focus detection device to detect the focus adjustment state of said photographic lens, and then controls said display device to display said exposure value and said focus adjustment state; and, at the time point when this display of said exposure value and said focus adjustment state has been completed, if and only if said preparation for photography signal is still being input from said release switch assembly, controls said lens drive device to perform focus adjustment of said photographic lens.

2. A camera according to claim 1, further characterized by comprising:

an exposure device which exposes a film according to said exposure value calculated by said photometric device; and:

in that said control device:

when said photography command signal is input from said release switch assembly without any substantial time lapse after said preparation for photography signal is input therefrom, controls said photometric device to calculate said exposure value and controls said focus detection device to detect the focus adjustment state of said photographic lens, thereafter controls said lens drive device to perform focus adjustment of said photographic lens, and thereafter controls said exposure device to expose said film.

3. A camera comprising:

a photographic lens;

a shutter release button;

a photometric device which measures the brightness of an object to be photographed, and which calculates an exposure value based upon this measured brightness;

a focus detection device which detects the focus adjustment state of said photographic lens;

a lens drive device which performs focus adjustment of said photographic lens based upon the focus adjustment state detected by said focus detection device;

a display device which displays said exposure value calculated by said photometric device and said focus adjustment state detected by said focus detection device;

an exposure device which exposes a film according to said exposure value calculated by said photometric device; and a release switch assembly which outputs a preparation for photography signal when said shutter release button is depressed as far as a first stroke position thereof, and which outputs a photography command signal when said shutter release button is depressed past said first stroke position as far as a second stroke position thereof which is further than said first stroke position;

characterized by further comprising a control device which:

when said photography command signal is input from said release switch assembly without any substantial time lapse after said preparation for photography signal is input therefrom, controls said photometric device to calculate said exposure value and controls said focus detection device to detect the focus adjustment state of said photographic lens, thereafter controls said lens drive device to perform focus adjustment of said photographic lens without the operation of displaying said exposure value and said focus adjustment state on said display device, and thereafter controls said exposure device to expose said film.

4. A camera comprising:

a photographic lens;

a shutter release button;

a photometric device which measures the brightness of an object to be photographed, and which calculates an exposure value based upon this measured brightness;

a distance measurement device which measures the photographic distance to said object to be photographed;

a lens drive device which performs focus adjustment of said photographic lens based upon the photographic distance measured by said distance measurement device;

a display device which displays said exposure value calculated by said photometric device and said photographic distance measured by said distance measurement device; and:

a release switch assembly which outputs a preparation for photography signal when said shutter release button is depressed as far as a first stroke position thereof, and which outputs a photography command signal when said shutter release button is depressed past said first stroke position as far as a second stroke position thereof which is further than said first stroke position;

characterized by further comprising a control device which:

when said preparation for photography signal is input from said release switch assembly without said photography command signal being input therefrom, controls said photometric device to calculate said exposure value and controls said distance measurement device to measure said photographic distance, and then controls said display device to display said exposure value and said photographic distance; and, at the time point when this display of said exposure value and said photographic distance has been completed, if and only if said preparation for photography signal is still being input from said release switch assembly, controls said lens drive device to perform focus adjustment of said photographic lens.

5. A camera according to claim 4, further characterized by comprising:

an exposure device which exposes a film according to said exposure value calculated by said photometric device; and:

in that said control device:

when said photography command signal is input from said release switch assembly without any substantial time lapse after said preparation for photography signal is input therefrom, controls said photometric device to calculate said exposure value and controls said distance measurement device to detect said photographic distance, thereafter controls said lens drive device to perform focus adjustment of said photographic lens, and thereafter controls said exposure device to expose said film.

6. A camera comprising:

a photographic lens;

a shutter release button;

a photometric device which measures the brightness of an object to be photographed, and which calculates an exposure value based upon this measured brightness;

a distance measurement device which measures the photographic distance to said object to be photographed;

a lens drive device which performs focus adjustment of said photographic lens based upon the photographic distance measured by said distance measurement device;

a display device which displays said exposure value calculated by said photometric device and said photographic distance measured by said distance measurement device;

an exposure device which exposes a film according to said exposure value calculated by said photometric device; and a release switch assembly which outputs a preparation for photography signal when said shutter release button is depressed as far as a first stroke position thereof, and which outputs a photography command signal when said shutter release button is depressed past said first stroke position as far as a second stroke position thereof which is further than said first stroke position;

characterized by further comprising a control device which:

when said photography command signal is input from said release switch assembly without any substantial time lapse after said preparation for photography signal is input therefrom, controls said photometric device to calculate said exposure value and controls said distance measurement device to measure said photographic distance, thereafter controls said lens drive device to perform focus adjustment of said photographic lens without the operation of displaying said exposure value and said photographic distance on said display device, and thereafter controls said exposure device to expose said film.

* * * * *